United States Patent
Colton, Sr. et al.

(10) Patent No.: US 8,127,787 B2
(45) Date of Patent: Mar. 6, 2012

(54) SIPHON BREAKER

(75) Inventors: Grant A. Colton, Sr., Butler, PA (US); Joseph E. Lescovich, Pittsburgh, PA (US)

(73) Assignee: GA Industries, LLC, Cranberry Township, PA (US)

(*) Notice: Subject to any disclaimer, the term of this patent is extended or adjusted under 35 U.S.C. 154(b) by 980 days.

(21) Appl. No.: 12/058,867

(22) Filed: Mar. 31, 2008

(65) Prior Publication Data

US 2009/0020163 A1 Jan. 22, 2009

Related U.S. Application Data

(60) Provisional application No. 60/921,101, filed on Mar. 30, 2007.

(51) Int. Cl.
*F04F 10/00* (2006.01)
*F16L 43/00* (2006.01)

(52) U.S. Cl. ............... 137/143; 137/115.03; 137/216.2; 137/218

(58) Field of Classification Search ............ 137/143, 137/147, 218, 217, 216.2, 216, 215, 142, 137/123, 115.12, 487.5; 251/339, 58, 231, 251/305

See application file for complete search history.

(56) References Cited

U.S. PATENT DOCUMENTS

| 1,435,396 | A | * | 11/1922 | Howland | 137/217 |
| 4,135,696 | A | * | 1/1979 | Saarem et al. | 251/30.02 |
| 4,508,136 | A | * | 4/1985 | Kah, Jr. | 137/218 |
| 5,564,457 | A | * | 10/1996 | Beck | 137/15.06 |
| 7,059,341 | B2 | * | 6/2006 | Kumar et al. | 137/143 |
| 2003/0221723 | A1 | * | 12/2003 | Colton, Sr. | 137/218 |

* cited by examiner

*Primary Examiner* — Stephen M Hepperle
*Assistant Examiner* — Seth Faulb
(74) *Attorney, Agent, or Firm* — The Webb Law Firm

(57) ABSTRACT

A siphon breaker includes a housing having a gas inlet and a gas outlet. The siphon breaker includes a stop valve adapted to transition from a closed position in which gas is substantially prevented from entering the gas inlet, and an open position in which gas is introduced into the gas inlet. The siphon breaker includes a control valve having a control valve gas inlet, a control valve gas outlet, and an electrically operated actuator. The control valve is adapted to transition from a closed position in which gas is substantially prevented from entering the control valve gas inlet, to an open position in which gas is through the control valve gas inlet.

11 Claims, 2 Drawing Sheets

SIPHON BREAKER

CROSS-REFERENCE TO RELATED APPLICATION

The present application claims priority to U.S. Provisional Application Ser. No. 60/921,101 entitled "Siphon Breaker" filed Mar. 30, 2007, the entire disclosure of which is herein incorporated by reference.

BACKGROUND OF THE INVENTION

1. Field of the Invention

The present invention relates to anti-siphon valves and, more particularly, to a siphon breaker having a check valve and a butterfly valve.

2. Description of Related Art

Siphons are used for many purposes, such as to drain or fill ponds, provide a water-source to a desired location, or to generally move ground water. A siphon is a continuous pipe, hose, or tube that allows liquid to drain from a body of liquid through an intermediate point that is higher than the body of liquid. The up-slope flow of a siphon through the elevated intermediate point is driven by hydrostatic pressures and does not require pumping. In operation, the pipe must have a first end submerged in the body of liquid and a second end positioned at a location that is lower than the body of liquid. As the liquid drains out of the pipe at the lower end, a vacuum is formed within the pipe that draws the liquid from the body of liquid through the elevated intermediate point.

In certain pumping operations, a pump is configured to pump liquid from a lower level to a body of liquid at a higher level. If the pump fails or is interrupted in some manner, the liquid-pressure within the pumping system is lessened. Consequently, a back-siphon can form in which liquid at the lower end of the pipe can draw liquid from the body of liquid at the higher level. This is particularly of concern when a siphon connects a plumbing system with a reservoir, or when a siphon connects an area to be drained with a lake or ocean reservoir. As water, or other liquid, is delivered to other areas of the plumbing system during use, the pressure within the system may be lessened and water, or other liquid, can be drawn back out of the reservoir through a back-siphon. This can cause contamination of the plumbing system and/or unintentional flooding of the area.

Consequently, there is a need for an improved anti-siphon valve which prevents the backward flow of liquid from a reservoir into a plumbing system.

SUMMARY OF THE INVENTION

In an embodiment of the present invention, a siphon breaker includes a housing having an interior, a gas inlet in communication with the interior, and a gas outlet in communication with the interior. The siphon breaker further includes a stop valve integral with at least a portion of the housing. The stop valve adapted to transition from a closed position in which gas is substantially prevented from entering the gas inlet, and an open position in which gas is introduced into the interior of the housing through the gas inlet. The siphon breaker further includes a control valve having a control valve interior. The control valve includes a control valve gas inlet in communication with the control valve interior, a control valve gas outlet in communication with the control valve interior, and an electrically operated actuator. The control valve is adapted to transition from a closed position in which gas is substantially prevented from entering the control valve gas inlet, to an open position in which gas is introduced into the control valve interior through the control valve gas inlet.

The stop valve of the siphon breaker may be a paddle actuated valve including a paddle adapted for receipt at least partially within an interior of a conduit. The conduit may be adapted for receiving liquid flow therethrough. The paddle may be connected to a valve seal disposed within the housing interior. The paddle may be adapted to transition from a first position in which the valve seal substantially prevents gas from entering the gas inlet, to a second position in which the valve seal is moved to allow gas to enter the housing interior through the gas inlet. The paddle may be transitioned from the first position to the second position by reverse flow of liquid within the conduit.

The gas outlet of the control valve may be adapted for communication with an interior of a conduit adapted for receiving liquid flow therethrough. The control valve may include a seal adapted to transition from a first position in which the seal substantially prevents gas from entering the control valve gas inlet, to a second position in which the seal is moved to allow gas to enter the control valve interior through the control valve gas inlet.

The siphon breaker may further include a conduit adapted for receiving liquid flow therethrough in communication with the gas outlet of the housing and the control valve gas outlet. Gas may be introduced into the conduit when at least one of stop valve and the control valve are in the open position. The presence of gas within the conduit disrupts a siphon formed therein.

In another embodiment of the present invention, a siphon breaking system includes a pump having an inlet and an outlet. The siphon breaking system may also include a siphon breaker. The siphon breaker may include a housing having an interior, a gas inlet in communication with the interior, and a gas outlet in communication with the interior. The siphon breaker may further include a stop valve integral with at least a portion of the housing and adapted to transition from a closed position in which gas is substantially prevented from entering the gas inlet, and an open position in which gas is introduced into the interior of the housing through the gas inlet. The siphon breaker may also include a control valve having a control valve interior. The control valve includes a control valve gas inlet in communication with the control valve interior, a control valve gas outlet in communication with the control valve interior, and an electrically operated actuator. The control valve is adapted to transition from a closed position in which gas is substantially prevented from entering the control valve gas inlet, to an open position in which gas is introduced into the control valve interior through the control valve gas inlet. The siphon breaking system also includes a conduit adapted to receive liquid flow therethrough directed by the pump. An interior of the conduit may be in fluid communication with the gas outlet of the housing and the control valve gas outlet. The interior of the conduit may be provided to receive gas therein when at least one of the stop valve and the control valve are in the open position.

The stop valve may be a paddle actuated valve including a paddle connected to a valve seal disposed within the housing interior and adapted for receipt at least partially within an interior of the conduit. The paddle may be adapted to transition from a first position in which the valve seal substantially prevents gas from entering the gas inlet, to a second position in which the valve seal is moved to allow gas to enter the housing interior through the gas inlet.

In yet another embodiment of the present invention, a method for operating a siphon breaker includes the step of providing a siphon breaker upstream of a pump operated to pump liquid through the siphon breaker. The siphon breaker may include a housing having an interior, a gas inlet in communication with the interior, and a gas outlet in communication with the interior. The siphon breaker may also include a stop valve integral with at least a portion of the housing and adapted to transition from a closed position in which gas is substantially prevented from entering the gas inlet, and an open position in which gas is introduced into the interior of the housing through the gas inlet. The siphon breaker may further include a control valve having a control valve interior. The control valve may include a control valve gas inlet in communication with the control valve interior, a control valve gas outlet in communication with the control valve interior, and an electrically operated actuator. The control valve may be adapted to transition from a closed position in which gas is substantially prevented from entering the control valve gas inlet, to an open position in which gas is introduced into the control valve interior through the control valve gas inlet. The method for operating a siphon breaker may also include the steps of ceasing pumping of liquid through the siphon breaker by the pump, and transitioning at least one of the stop valve and the control valve from the open position to the closed position. Further, the method for operating the siphon breaker may include the step of introducing gas into at least one of the gas inlet housing and the control valve gas inlet of the siphon breaker.

DETAILED DESCRIPTION OF THE PREFERRED EMBODIMENTS

Figure 1:
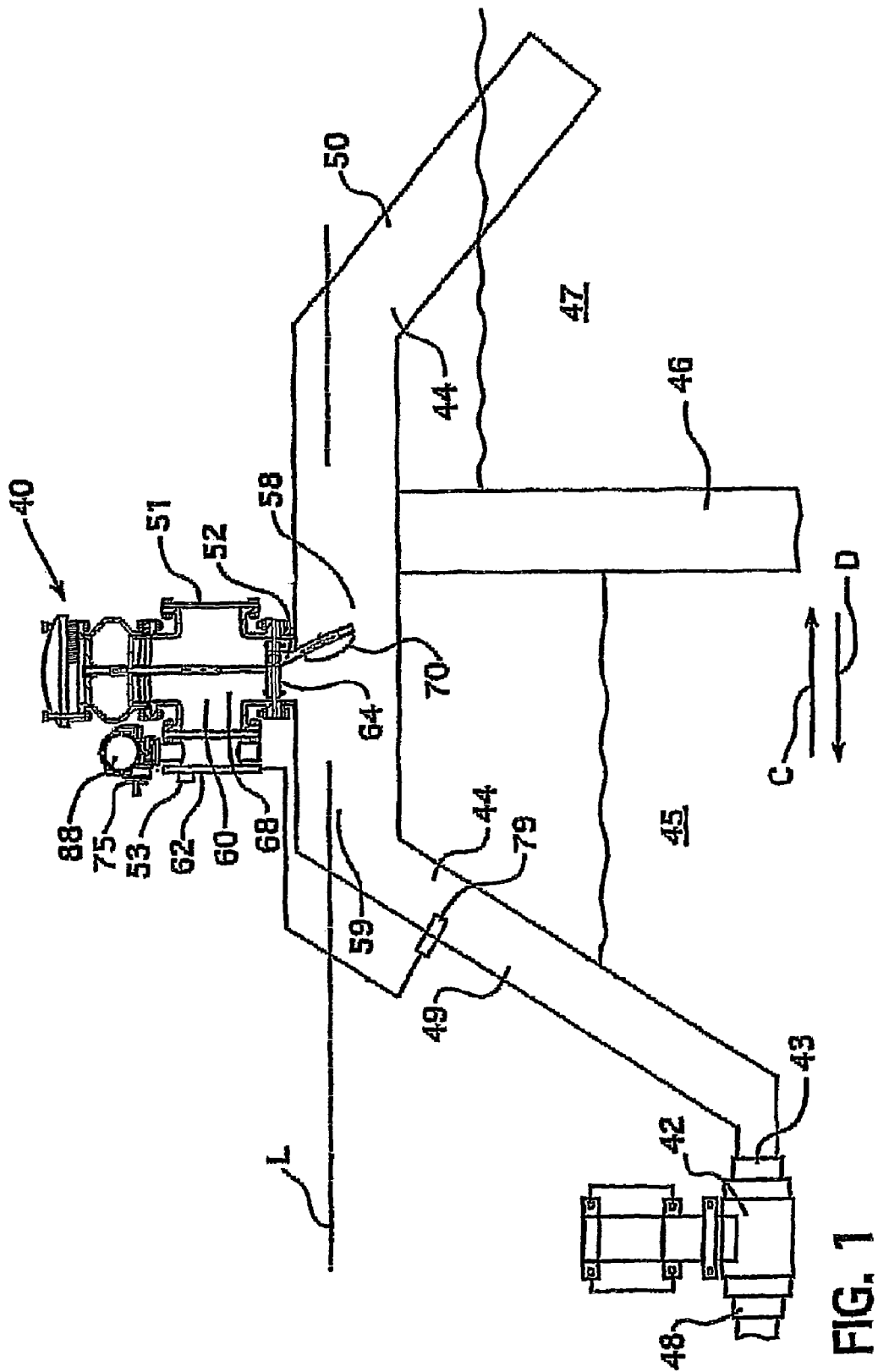
FIG. 1 is a partial cross-sectional schematic representation of a siphon breaker system in accordance with an embodiment of the present invention.

A siphon breaker 40 of the present invention can be used in any pumping situation in which it is desirable to pump liquid from a lower level to a body of liquid at a higher level and to prevent liquid from the higher level to flow to the lower level in the event of a normal pump shut down or pump failure. As shown in FIG. 1, a pump 42, such as any conventionally known liquid pump, can be used to pump liquid from a canal or drainage area at a lower liquid level 45 over a levee or burm 46 and into a reservoir, ocean, or other liquid holding area at a higher liquid level 47. This type of pumping arrangement can also be effective in systems in which the drainage area positioned at a lower liquid level 45 is also connected to a plumbing system or clean water source, such as residential, commercial or municipal water systems. The pump 42 typically includes a liquid inlet 48 for the intake of liquid provided from the lower liquid level 45 and a liquid outlet 43 connected to a conduit, such as a discharge piping system 44. During operation of the pump 42 liquid, such as water, is pumped from the lower liquid level 45 through the liquid inlet 48 of the pump 42, out the liquid outlet 43 of the pump 42 and through piping system 44 over burm 46 and into a reservoir at a higher liquid level 47. The pump 42 can include a shutoff mechanism (not shown) for shutting off the pump 42. In one embodiment, the shutoff mechanism can include an intentional switch or function as well as unintentional pump failure, such as from a malfunction or power outage.

The piping system 44 can include any suitable configuration or piping segments, joining segments, valves, and other piping relating fixtures as are conventionally known. The piping system 44 may be made of polymeric and/or metal piping segments, which can be of any suitable length and diameter to accommodate the overall needs of the piping system 44 and the desired volume of liquid to be moved. In one embodiment, the siphon breaker 40 can be positioned in flow communication with the piping system 44. In one configuration, the siphon breaker 40 can be positioned between a substantially up-slope section 49 of the piping system 44 and a substantially down-slope section 50 of the piping system 44. The down-slope section 50 of the piping system 44 can be positioned within the liquid in the higher liquid level 47.

Figure 2:
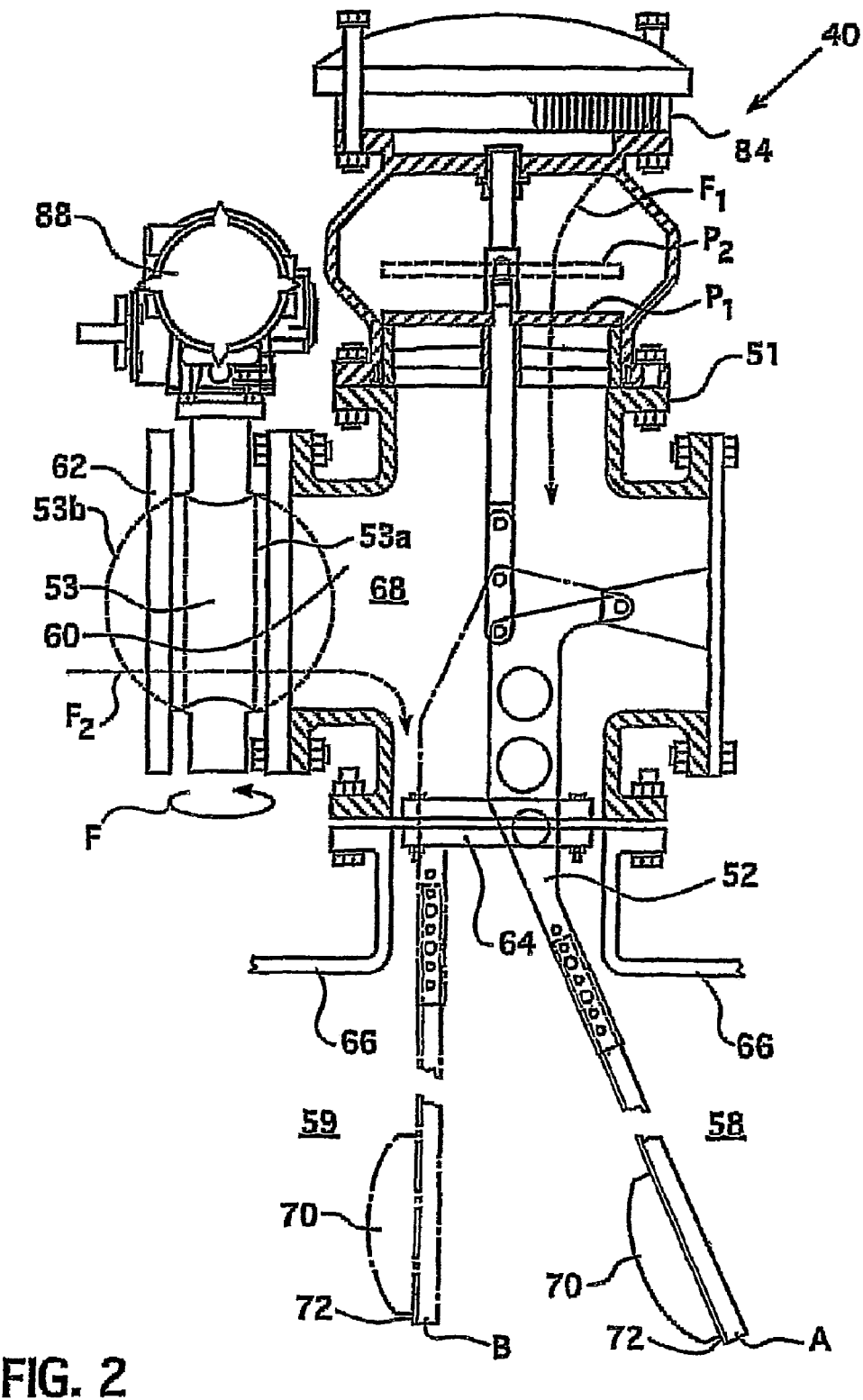
FIG. 2 is a cross-sectional schematic representation of a siphon breaker in accordance with an embodiment of the present invention.

As shown in FIGS. 1-2, the siphon breaker 40 includes a housing 51 including a stop valve 52, such as a paddle actuated stop valve, and a control valve 53, such as a butterfly valve. The housing 51 may be at least partially disposed within a piping system 44, such as between a liquid inlet 59 and a liquid outlet 58 configured, such that liquid may pass from the liquid inlet 59 to the liquid outlet 58 during normal operation of the pump 42. In one embodiment, the siphon breaker 40 may be connected between two piping sections 44, such that the first piping section is connected to the liquid inlet 59 and the second piping section is connected to the liquid outlet 58. In another embodiment, the siphon breaker 40 may be disposed through at least a portion of a sidewall of a portion of the piping system 44, such that the liquid inlet 59 and the liquid outlet 58 are coextensive with the portion of the piping system 44. The siphon breaker 40 may be mounted to the piping system 44 by mounting elements 66, such as bolts or other similar fasteners. In another embodiment, the liquid inlet 59 and the liquid outlet 58 are contiguous portions of the piping system 44 in fluid communication with a portion of the interior of the siphon breaker 40. The housing 51 of the siphon breaker 40 also includes an interior 68, and a gas inlet 84 adapted to allow gas, such as air, therethrough and into the interior 68. The housing 51 also includes a gas outlet 64 in communication with the interior 68 such that gas entering the interior 68 of the housing 51 may pass from the interior 68 out through the gas outlet 64 and into the piping system 44.

In one embodiment, the stop valve 52 of the siphon breaker 40 is provided integral with at least a portion of the housing 51. The stop valve 52 may be a paddle actuated valve having a paddle 70 adapted for receipt at least partially within an interior of the piping system 44. The paddle 70 may be disposed at least partially within the interior of the piping system 44 and transitionable between an open position, shown in FIG. 2 as "A", and a closed position, shown in FIG. 2 as "B". In the open position, the paddle 70 is offset from the perpendicular orientation, such that liquid may pass therearound, such as from the up-slope section 49 to the down-slope section 50. When the stop valve 52 is in the open position, liquid may pass from the liquid inlet 59 to the liquid outlet 58. The paddle 70 is connected to a valve seal, shown in FIG. 2 in the closed position as $P_1$ and in the open position as $P_2$. When the stop valve 52 is in the closed position, the valve seal $P_1$ prevents gas from entering the gas inlet 84. When the stop valve 52 is in the open position, the valve seal $P_2$ is opened to allow gas to enter the interior 68 of the housing 51 through the gas inlet 84. In one embodiment, the interior 68 of the housing 51 is at least slightly biased toward negative pressure, such that air entering the gas inlet 84 is sucked into the interior 68 of the housing 51 along flow path $F_1$ as shown in FIG. 2.

In one embodiment, the stop valve 52 is capable of transitioning from an open position in which liquid flows in the pumped direction, shown in FIG. 1 by the orientation of arrow C, to a closed position in which reverse flow acts upon the paddle 70 to close the paddle 70, shown in FIG. 1 by the orientation of arrow D. In one embodiment, the paddle 70 is a weighed paddle.

During operation, when the pump 42 fails or the shutoff mechanism of the pump 42 is activated, a siphon can form in which liquid from the higher liquid level 47 can flow into the lower liquid level 45. The reverse flow of liquid within the piping system 44 may cause the paddle 70 of the stop valve 52 to transition from the first position A, in which gas is substantially prevented from entering the gas inlet 84, to the second position B, in which gas is introduced into the interior 68 of the housing along flow path $F_1$. Gas introduced into the interior 68 of the housing 51 is then directed into the piping system 44 though the gas outlet 64. When gas is directed into the piping system 44 from the gas outlet 64, a siphon formed within the piping system 44 due to failure of the pump 42 is disrupted, thereby terminating reverse flow of liquid through the piping system 44.

In certain situations, the paddle 70 of the stop valve 52 may not function as intended and may stick in the open position A. In these circumstances, the siphon breaker 40 of the present invention provides dual means for interrupting the undesirable flow of liquid during pump failure. The control valve 53 of the present invention is also adapted to allow gas to be introduced into the piping system 44 for the purpose of disrupting reverse flow.

In one embodiment, the control valve 53 is a butterfly valve, although other types of open/close valves may be used, for example, gate valves or plug valves. The control valve 53 includes an interior in communication with a gas inlet 62 and a gas outlet 60. In one embodiment, the control valve 53 is integral with a portion of the housing 51 and the gas outlet 60 of the control valve 53 is in communication with the gas outlet 64 of the housing 51. In another embodiment, the control valve 53 may be positionable remote from the housing 51, such that the gas outlet 60 of the control valve 53 is in communication with the interior of a portion of the piping system 44. In this configuration, the control valve 53 may be spaced apart from the housing 51. The control valve 53 may be affixed to a portion of the piping system 44 through any conventional valve-piping joining means. In one embodiment, the control valve 53 is positioned upstream of the housing 51 along the piping system 44.

In one embodiment, the control valve 53 can include a plate, shown in FIG. 2 in the closed position as 53a and in the open position as 53b, the plate 53a, 53b disposed adjacent the gas inlet 62. The control valve 53 is transitionable from a closed position 53a in which gas is prevented from entering the gas inlet 62, to an open position 53b in which gas may enter the gas inlet 62. In operation, when the control valve 53 is transitioned from the closed position 53a to the open position 53b gas, such as air, is drawn through the gas inlet 62, into the interior of the control valve 53, and expelled through the gas outlet 60. The gas from the gas outlet 60 may then be directed into the piping system 44, shown in FIG. 1, such as directly introduced or first passed through the gas outlet 64 of the housing 51.

In one embodiment, the plate 53a, 53b of the butterfly valve 53 is rotatable in the direction shown in FIG. 2 by the arrow F. The plate 53a, 53b may be constructed to pivot between a first position and a second position, such as by an actuator motor 88 as is generally known. The plate 53a, 53b of the butterfly valve 53 may be configured to transition between a sealing orientation and a through-flow orientation, as is also generally known. The plate 53a, 53b may have any desired shape, such that the plate 53a, 53b can form a seal to substantially prevent gas from entering the control valve 53 when the plate 53a is in the first closed position. In one embodiment, the plate 53a, 53b has a generally circular cross-section, as shown in FIG. 2, by the indicator 53b. The plate 53a, 53b may be aligned along the longitudinal axis L of the piping system 44, shown in FIG. 1, in the open position thereby allow gas to enter the piping system 44. The plate 53a, 53b may also be structured such that it is aligned substantially across, such as substantially perpendicularly across, the longitudinal axis L of the piping system 44, in the closed position such that gas is substantially prevented from entering the piping system 44.

In normal operation, the actuator motor 88 maintains the control valve 53 in the generally closed position such that gas is prevented from entering the control valve 53. However, when the pump 42 is shut down, a switch or controller is activated, which activates the actuator motor 88, thereby transitioning the control valve 53 from the closed position to the open position. In the open position, the plate 53b is oriented to allow gas to flow into the gas inlet 62 and be directed into the piping system 44 along flow path $F_2$, shown in FIG. 2, thereby disrupting any siphon formed therein along with the stop valve 52. In a further embodiment, the control valve 53 may include a manual override switch 75 thereby allowing the control valve 53 to be transitioned to the open position even in the event that there is a system-wide power outage.

In one embodiment, the control valve 53 may be transitioned from the closed position to a partially open position, such as about 75% open position. At this time, the control valve 53 may shut off power to the pump 42 by a shut-off circuit (not shown). Once the power to the pump 42 is shut off, the control valve 53 may fully transition to the open position. In another embodiment, once it is desired to re-initiate pumping, power is returned to the pump 42. During re-initiation, the control valve 53 may be in the open position until forward flow of liquid within the piping system 44 is detected by a sensor 79. Once forward flow of liquid is detected, the sensor 79 may supply power to the actuator motor 88 to close the control valve 53.

Accordingly, the siphon breaker 40 of the present invention provides dual means for preventing reverse liquid flow through a piping system 44 due to pump failure or pump shut down. Both the stop valve 52 and the control valve 53 are adapted to introduce gas into the piping system 44 when transitioned from the closed position to the open position. Introduction of gas into the piping system 44 disrupts any siphon formed within the piping system 44 resulting from pump failure. Accordingly, liquid at the higher liquid level 47 is prevented from transitioning through the piping system 44 to the lower liquid level 45 when the stop valve 52 and/or the control valve 53 are in the open position. This reduces damage to the pump 42 caused by the back-flow of liquid, and reduces the risk of contamination from the back-flow of liquid from the higher liquid level 47 or holding area, into the lower liquid level 45 or drainage area.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:
1. A siphon breaker, comprising:
 a housing having an interior, a gas inlet in communication with the interior, and a gas outlet in communication with the interior;

a stop valve integral with at least a portion of the housing and adapted to transition from a closed position in which gas is substantially prevented from entering the gas inlet, and an open position in which gas is introduced into the interior of the housing through the gas inlet;

wherein the stop valve is a paddle actuated valve comprising a paddle adapted for receipt at least partially within an interior of a conduit adapted for receiving liquid flow therethrough; and a control valve comprising a control valve gas inlet in communication with a control valve gas outlet; and wherein the control valve is adapted to transition from a closed position in which gas is substantially prevented from entering the control valve gas inlet, to an open position in which gas is introduced into the control valve through the control valve gas inlet.

2. The siphon breaker of claim 1, wherein the paddle is connected to a valve seal disposed within the housing interior.

3. The siphon breaker of claim 2, wherein the paddle is adapted to transition from a first position in which the valve seal substantially prevents gas from entering the gas inlet, to a second position in which the valve seal is moved to allow gas to enter the housing interior through the gas inlet.

4. The siphon breaker of claim 3, wherein the paddle is transitioned from the first position to the second position by reverse flow of liquid within the conduit.

5. The siphon breaker of claim 1, wherein the gas outlet of the control valve is adapted for communication with an interior of a conduit adapted for receiving liquid flow therethrough.

6. The siphon breaker of claim 1, wherein the control valve comprises a seal adapted to transition from a first position in which the seal substantially prevents gas from entering the control valve gas inlet, to a second position in which the seal is moved to allow gas to enter the control valve interior through the control valve gas inlet.

7. The siphon breaker of claim 1, further comprising a conduit adapted for receiving liquid flow therethrough in communication with the gas outlet of the housing and the control valve gas outlet.

8. The siphon breaker of claim 7, wherein gas is introduced into the conduit when at least one of stop valve and the control valve are in the open position.

9. The siphon breaker of claim 8, wherein the presence of gas within the conduit disrupts a siphon.

10. A siphon breaking system comprising:
a pump, having an inlet and an outlet;
a siphon breaker, comprising:
  a housing having an interior, a gas inlet in communication with the interior, and a gas outlet in communication with the interior;
  a stop valve integral with at least a portion of the housing and adapted to transition from a closed position in which gas is substantially prevented from entering the gas inlet, and an open position in which gas is introduced into the interior of the housing through the gas inlet;
  wherein the stop valve is a paddle actuated valve comprising a paddle adapted for receipt at least partially within an interior of a conduit adapted for receiving liquid flow therethrough; and
  a control valve comprising a control valve gas inlet in communication with a control valve gas outlet,
  wherein the control valve is adapted to transition from a closed position in which gas is substantially prevented from entering the control valve gas inlet, to an open position in which gas is introduced into the control valve through the control valve gas inlet;
and a conduit adapted to receive liquid flow therethrough directed by the pump, an interior of the conduit in fluid communication with the gas outlet of the housing and the control valve gas outlet, the interior of the conduit receiving gas therein when at least one of the stop valve and the control valve are in the open position.

11. A method for operating a siphon breaker comprising the steps of:
providing a siphon breaker upstream of a pump operated to pump liquid through the siphon breaker, the siphon breaker comprising:
a housing having an interior, a gas inlet in communication with the interior, and a gas outlet in communication with the interior;
a stop valve integral with at least a portion of the housing and adapted to transition from a closed position in which gas is substantially prevented from entering the gas inlet, and an open position in which gas is introduced into the interior of the housing through the gas inlet
wherein the stop valve is a paddle actuated valve comprising a paddle adapted for receipt at least partially within an interior of a conduit adapted for receiving liquid flow therethrough; and
a control valve comprising a control valve gas inlet in communication with a control valve gas outlet,
wherein the control valve is adapted to transition from a closed position in which gas is substantially prevented from entering the control valve gas inlet, to an open position in which gas is introduced into the control valve through the control valve gas inlet;
transitioning at least one of the stop valve and the control valve from the open position to the closed position; and
introducing gas into at least one of the gas inlet housing and the control valve gas inlet of the siphon breaker.

* * * * *